July 14, 1931.  R. B. GEORGE  1,813,994
WINDING AND METHOD OF CONSTRUCTING THE SAME
Filed Nov. 19, 1927  4 Sheets-Sheet 1

INVENTOR
Robert B. George
BY
Wesley H. Carr
ATTORNEY

July 14, 1931. R. B. GEORGE 1,813,994
WINDING AND METHOD OF CONSTRUCTING THE SAME
Filed Nov. 19, 1927 4 Sheets-Sheet 3

INVENTOR
Robert B. George
BY
Wesley S. Carr
ATTORNEY

July 14, 1931. R. B. GEORGE 1,813,994
WINDING AND METHOD OF CONSTRUCTING THE SAME
Filed Nov. 19, 1927 4 Sheets-Sheet 4
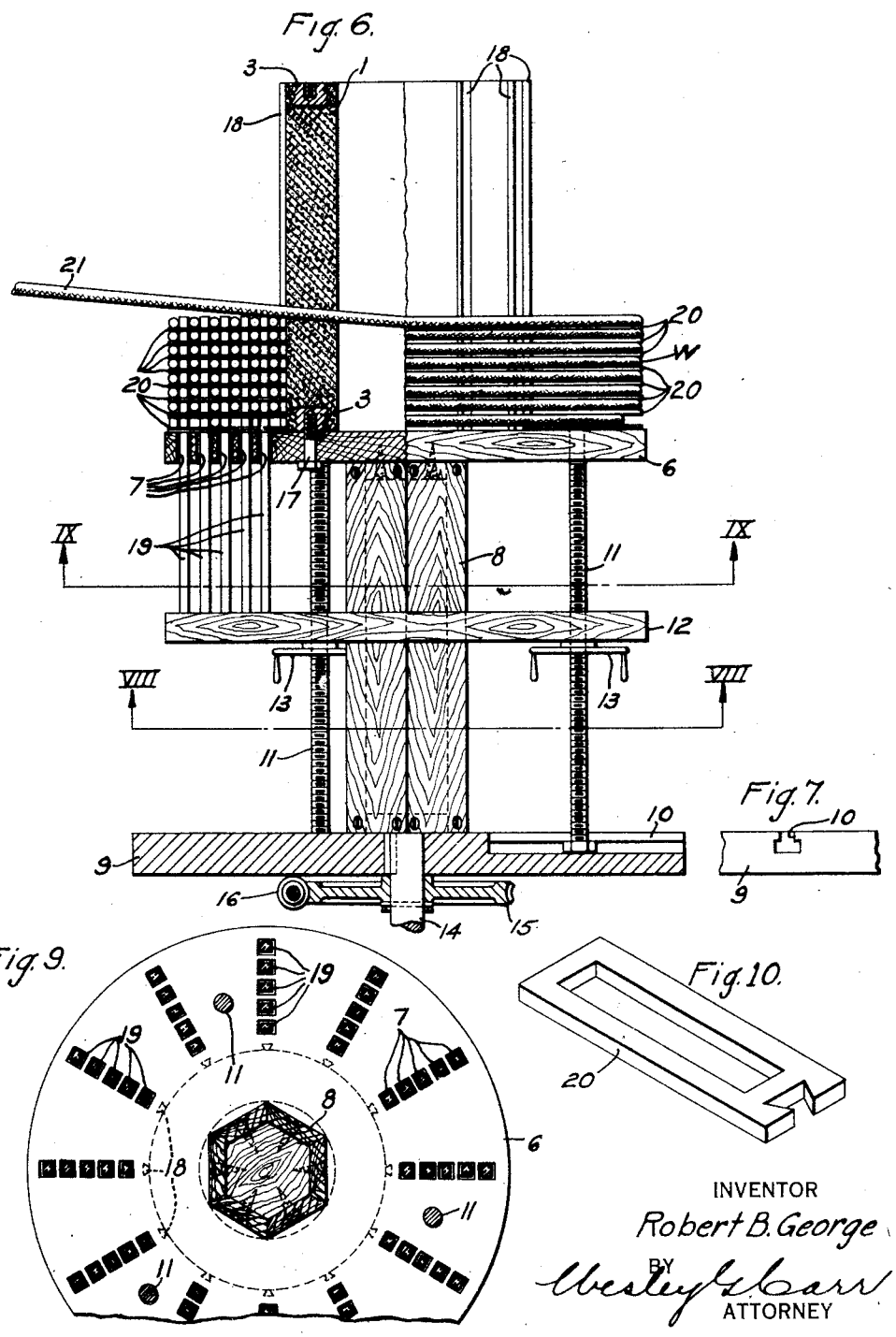
INVENTOR
Robert B. George
BY
ATTORNEY Patented July 14, 1931

1,813,994

UNITED STATES PATENT OFFICE

ROBERT B. GEORGE, OF SHARON, PENNSYLVANIA, ASSIGNOR TO WESTINGHOUSE ELECTRIC & MANUFACTURING COMPANY, A CORPORATION OF PENNSYLVANIA

WINDING AND METHOD OF CONSTRUCTING THE SAME

Application filed November 19, 1927. Serial No. 234,385.

My invention relates to a winding or coil structure particularly such as are utilized as a reactance in an electrical circuit.

In accordance with my invention, a winding, as aforesaid, is constructed or produced by successively forming conductor layers in superposed relation and disposing spacing members between and in a plane removed from the planes of adjacent conductor layers.

Further in accordance with my invention, the aforesaid spacing members are apertured and disposed in aligned groups for the reception of spacers or rods passing between adjacent convolutions of the conductor layers.

Further in accordance with my invention, the aforesaid spacing members are secured to members extending axially of the completed winding and are grouped in directions extending radially of a common point.

Further in accordance with my invention, the aforesaid members and vertical spacers are constructed of suitable insulating material such, for example, as a phenol condensation product, fibre, fullerboard, or any other suitable insulating material that is fire proof, such as asbestos-micarta, cement molded composition, and the like.

My invention resides in the method and novel structure or winding of the character hereinafter described and claimed.

For an understanding of my method and for an illustration of some of the forms my apparatus may take, reference is to be had to the accompanying drawings in which:

Fig. 6 is an elevational view, partly in section, of a machine or mechanism utilizable for constructing a winding and showing but a single set of spacing rods.

Fig. 7 is an elevational view of a part of the structure of Fig. 6.

Fig. 9 is a transverse, horizontal sectional view taken on the line IX—IX of Fig. 6 looking in the direction of the arrows and showing a plurality of sets of spacing rods.

Fig. 10 is a perspective view of a spacing member.

Figure 1:
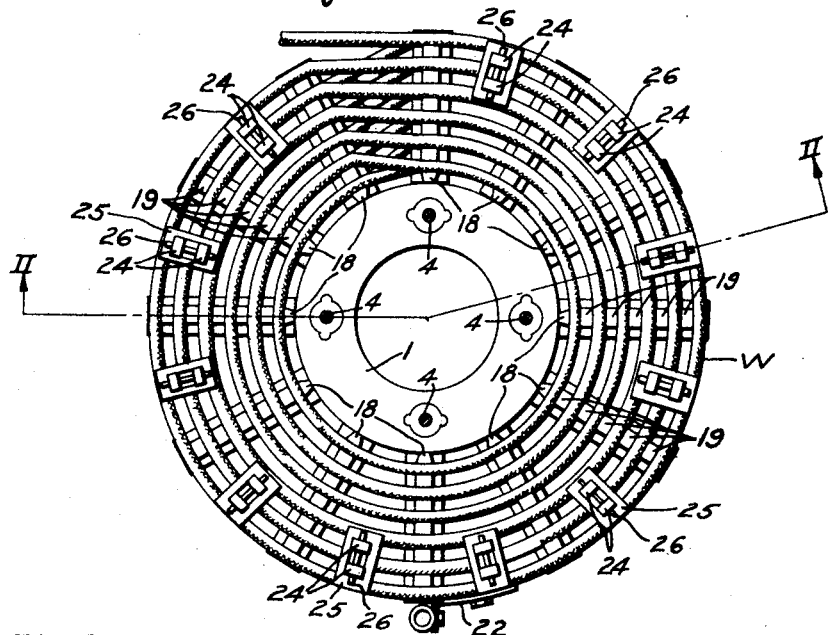
Figure 1 is a horizontal, sectional view taken on the line I—I of Fig. 2 looking in the direction of the arrows.
Figure 2:
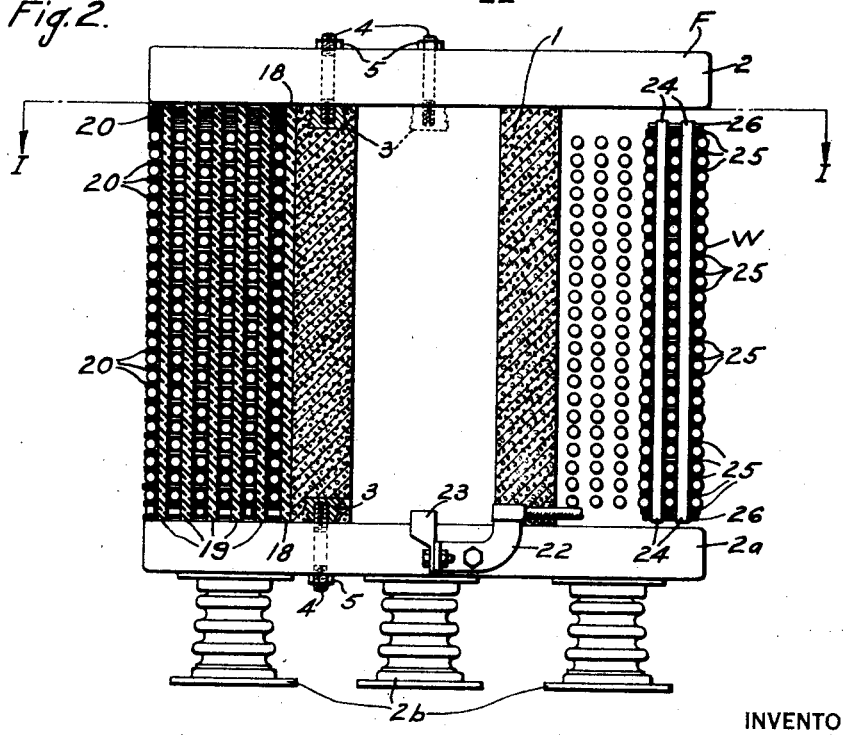
Fig. 2 is a vertical, sectional view taken on the line II—II of Fig. 1 looking in the direction of the arrows.

Referring to Figs. 1 and 2, there is illustrated a frame or supporting structure F. The frame F comprises a hollow cylinder 1 to opposite ends of which the plates or members 2, 2a are secured, the latter being provided with suitable insulating supporting members 2b.

Ordinarily the cylinder 1 and plates 2, 2a are formed of some material, as concrete, which, when in a fluid or semi-fluid state, is placed in suitable molds wherein the material hardens or sets and retains the configuration imposed by the molds.

When the fluid or semi-fluid material from which the cylinder 1 is made is placed in its mold, inserts or fastening members 3 are temporarily held in suitable spaced relation at each end of the mold and within the aforesaid material. Accordingly, when the latter hardens or sets, the inserts 3 are permanently retained in position at each end of the cylinder 1.

The inserts 3 are interiorly threaded for the reception of fastening elements or bolts 4, a set of which extends through the plate 2 and another set of which extends through the plate 2a, each bolt 4 being threaded into one of the inserts 3 and at its other end having clamping nut 5 secured thereto whereby the cylinder 1 and the plates 2, 2a are securely maintained in assembled relation.

Encircling the member 1 and disposed between the plates 2, 2a is a winding or coil W constructed or formed as hereinafter described.

Referring to Figs. 6, 7, 8 and 9, there is illustrated a base or supporting plate 6 provided with radially extending rows of passages or openings 7. Depending from the plate 6 is a member or stem 8 carried by a plate-like member 9 having a plurality of radially extending passages 10, each preferably shaped as an inverted T and each receiving the head of a threaded bolt or member 11, all of which extend toward and are secured to the plate 6. Non-rotatably secured to the stem 8 is a plate 12 freely slidable thereon and on the aforesaid bolts 11. Threaded to each of the bolts 11 is a wheel 13, all of which co-act with the lower surface of the plate 12, whereby the plate 12 may be moved toward the plate 6, as hereinafter described. Secured to the member 9 is a shaft 14 having keyed thereto a gear 15 which meshes with a gear 16 driven by any suitable source of power, not shown, whereby rotative movement is imparted to the rotating structure comprising the member 9, stem 8 and plates 6 and 12.

The aforesaid cylinder 1, with its plates 2, 2a removed, is carried by the plate 6 and, preferably, is secured temporarily thereto, with its longitudinal axis substantially coinciding with the longitudinal axis of stem 8, by screws 17 extending through said plate 6 and threaded into the respective inserts 3 disposed at one end of the member 1. Accordingly, when gear 16 is actuated, rotative movement is imparted to the cylinder 1.

The coil or winding W is constructed by utilizing mechanism of the character illustrated in Figs. 6, 7, 8 and 9. In so doing, guide strips or members 18 are disposed on the exterior surface of cylinder 1 parallel with its longitudinal axis, each guide strip 18 being in alignment with a row of the passages 7 in plate 6. The guide strips 18, ordinarily, are temporarily held in the position described by any suitable arrangement, not shown, as for example, by banding one or two turns of tape around the guide strips 18 and the cylinder.

The plate 12 is then moved to a position substantially lower than illustrated in Fig. 6 and a spacer or member 19 is passed through each opening 7 into engagement with the upper surface of plate 12 which, thereupon is moved upwardly by the wheels 13 until the upper ends of spacers 19 are positioned above the upper surface, the first spacing member 20 on plate 6 a distance only slightly greater than the diameter of the hereinafter described conductor from which the winding W is formed.

One or more cleats or spacing members 20 having a configuration as illustrated in Fig. 10 is or are now engaged with each of the guide strips 18 and passed over the upper ends of spacers 19 to thereby position them on the upper surface of plate 6. A suitable electrical conductor 21 is unwound from a suitable supply reel (not shown) and disposed upon the upper surfaces of the aforesaid cleats 20 as one or more turns of the winding. The aforesaid conductor 21 in a region near its extreme end, is disposed in the space between a pair of the innermost or, as shown the outermost, adjacent spacers 19 and then movement is imparted to the aforesaid rotating structure, the operator meanwhile placing the conductor 21 in the spaces between adjacent spacers 19 as they pass in succession before him so that the winding converges spirally inwardly as viewed near the bottom of Fig. 3. Preferably, and as illustrated in Fig. 3, if the lowermost conductor layer comprises more than a single turn, it is desirable that adjacent convolutions be spaced from each other a distance corresponding to the distance $b$, Fig. 3, this being effected by placing adjacent convolutions not in adjacent spaces between the spacers 19 but in spaces between said rods separated by at least one space defined by a pair of the spacers 19.

Figure 3:
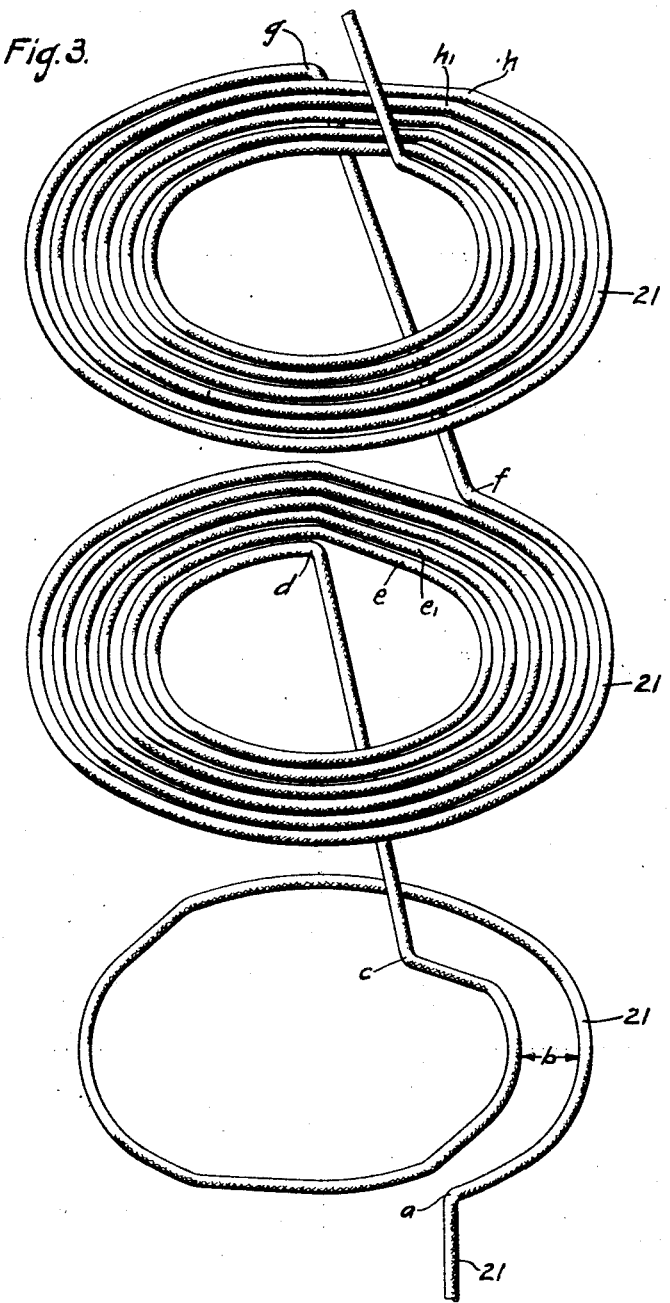
Fig. 3 is a distorted, perspective view illustrating one manner of forming a winding.

When the lowermost conductor layer, whether of the character illustrated near the bottom of Fig. 3 or of other desired character, is completed, movement of the aforesaid rotating structure is discontinued. The wheels 13 are then operated to again move the spacers 19 upwardly a distance only slightly greater than the diameter of the conductor 21 and again, one or more of the cleats 20 is or are engaged with each of the guide strips 18 and passed over the upper ends of spacers 19 to thereby position them on the upper surface of the lowermost conductor layer.

The operator then bends the conductor 21 upwardly as illustrated at $c$, Fig. 3, and again initiates operation of the rotating structure, the portion of said conductor thus bent up being closely adjacent the cylinder 1.

Conductor 21 is then bent, as at $d$, Fig. 3, back into a plane parallel with the plane of the lowermost conductor layer and is disposed within the space between the first strip 18 and adjacent spacer 19 that passes the operator. During continued movement of the rotating structure, the conductor 21 is disposed within the space between each strip 18 and the spacer 19 adjacent thereto until the cylinder 1 has rotated through nearly 360 degrees, at which time all of the spaces defined in part by the guide strips 18 are filled. Thereupon, the conductor 21 is bent as indicated at $e$, Fig. 3, slightly away from the cylinder 1 and is disposed in the next space passing the operator between the two spacers 19 nearest the cylinder 1. During continued movement of the rotating structure, the conductor 21 is disposed within the spaces between the respective successive pairs of the spacers 19 nearest the cylinder 1 until the latter has again rotated through nearly 360 degrees, at which time all of the spaces defined by the pairs of the spacers 19 nearest the cylinder 1 are filled. The conductor 21 is now bent as indicated at $e_1$, Fig. 3, and the operation last described is repeated successively to form conductor convolutions spiralling outwardly which fill all of the spaces between the spacers 19. In this manner, the first layer of the winding from the bottom is formed.

Movement of the aforesaid rotating structure is now discontinued. The wheels 13 are again operated to move the spacers 19 upwardly a distance only slightly greater than the diameter of the conductor 21, and, preferably, a single cleat 20 is engaged with each of the guide strips 18 and passed over the upper ends of spacers 19.

The operator then bends the conductor 21 upwardly, as at $f$, Fig. 3, and again initiates operation of the rotating structure. Conductor 21 is then bent, as at $g$, Fig. 3, back into a plane parallel with the planes of the conductor layers already formed and is disposed within the space between the first pair of outermost spacers 19 that pass the operator. During continued movement of the rotating structure, the conductor 21 is disposed within the space between each pair of the outermost spacers 19 until the cylinder 1 has rotated through nearly 360 degrees at which time all of the spaces defined by the outermost pairs of spacers 19 are filled. Thereupon, the conductor 21 is bent as indicated at $h$, Fig. 3, slightly toward the cylinder 1 and is disposed in the next space passing the operator between the outermost pair of rods 19 in which the conductor has not been disposed. During continued movement of the rotating structure, the conductor 21 is disposed within the space between each pair of the outermost spacers 19 until the cylinder 1 has rotated through nearly 360 degrees at which time all of the spaces defined by the outermost pairs of spacers 19 are filled. Thereupon, the conductor 21 is bent as indicated at $h'$, Fig. 3, slidably toward the cylinder 1 and is disposed in the next space passing the operator between the outermost pair of rods 19 in which the conductor has not been disposed. During continued movement of the rotating structure, the conductor 21 is disposed within the spaces between the respective outermost successive pairs of the spacers 19 in which the conductor 21 has not been disposed until the cylinder 1 has again rotated through nearly 360 degrees. The conductor 21 is now bent as indicated at $h_1$, Fig. 3, and the operation last described is repeated successively to form conductor convolutions converging spirally inwardly, the last convolution being disposed between the guide strips 18 and the innermost row of the spacers 19.

Accordingly, as outlined above, the winding W is built up from superposed conductor layers alternately spiralling outwardly and inwardly with respect to the cylinder 1.

Figure 4:
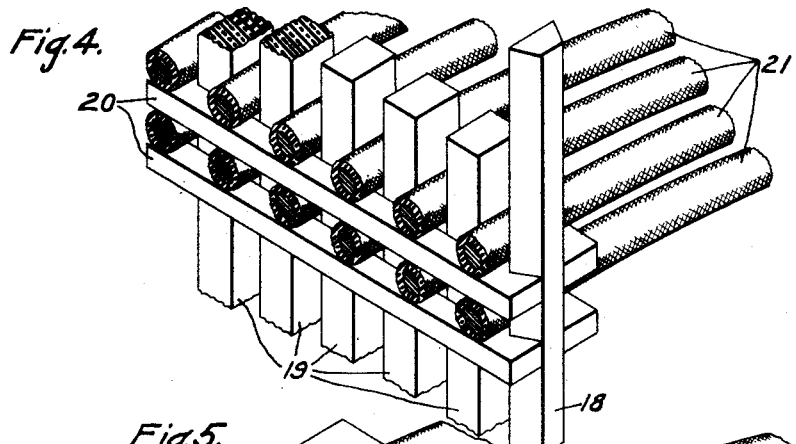
Figs. 4 and 5 are enlarged perspective views illustrating parts of a winding constructed in accordance with my invention.

The guide strips 18 and spacers 19, and the cleats or spacing members 20, should be formed of suitable insulating material even though the conductor 21 is provided with an insulating cover, as illustrated. Such insulating material may assume any one of a variety of forms such, for example, as a phenol condensation product, fibre, fullerboard, asbestos micarta, cement, or molded composition. The guide strips 18, in cross-section, preferably take the form of isosceles trapezoids, Fig. 4, and are arranged with their shorter parallel faces in direct engagement with the cylinder 1. When the strips 18 are thus constructed, the cleats 20 are each provided at one end with a similar shaped opening whereby the opening in each cleat may be brought into registering relation with the end of a strip 18 and then passed longitudinally thereof, to securely maintain the members in assembled relation. As illustrated particularly in Fig. 10, each of the members 20 preferably comprises a single passage through which all of the spacers 19 extend.

After the winding W has been wound, as aforesaid, and after a plurality of the cleats 20, preferably, have been disposed on the topmost conductor layer, the structure is removed from the plate 6, Fig. 6, and impregnated with or dipped in a suitable gum or other impregnating material. Thereafter, it is utilized as desired. For example, it may again be assembled on a cylinder 1 and the plates 2, 2a suitably secured thereto, as by the bolts 4, Fig. 2. Preferably, each of said plates 2 and 2a carry a terminal structure 22 to which one end of the conductor 21 is secured and which comprises a lug 23, or the like, by which the winding W is connected in an electrical circuit.

If desired, however, the aforesaid impregnating or dipping operation may be omitted in which case, the plates 2, 2a may be secured directly to the cylinder 1 after the winding W has been formed thereon.

Figure 5:
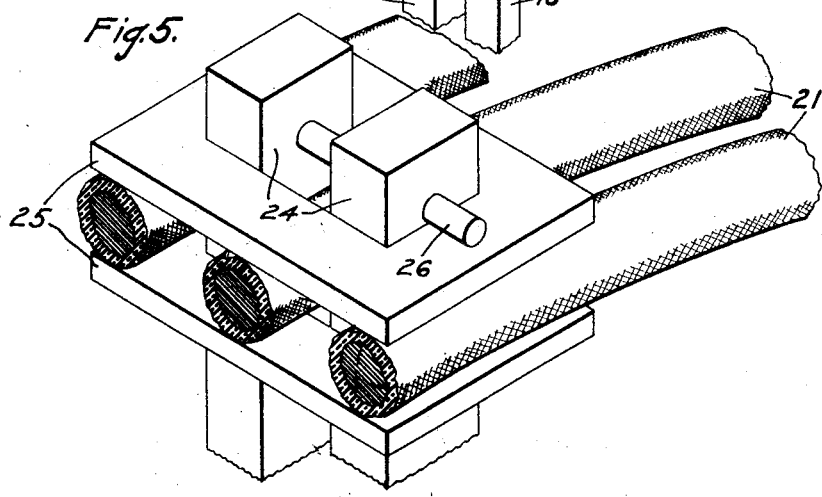
Figure 8:
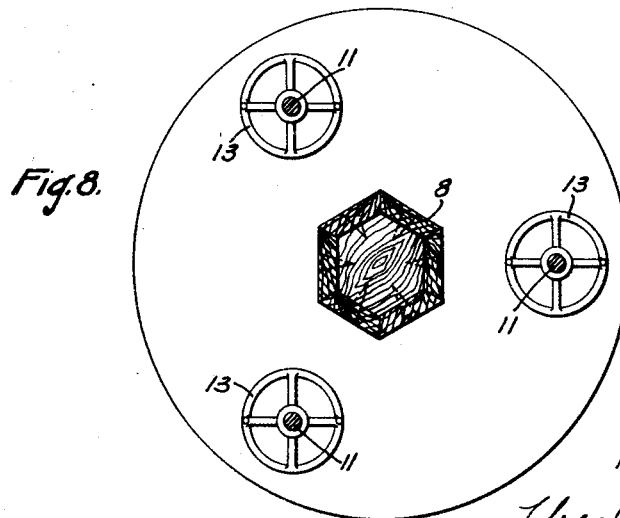
Fig. 8 is a transverse, horizontal, sectional view taken on the line VIII—VIII of Fig. 6 looking in the direction of the arrows.

At times, it may be desirable to reinforce the restraining action of the guide strips 18 and cleats 20, in which case, as illustrated in Figs. 1, 2 and 5, between each pair of vertically extending series of spacers 19, there may be disposed a plurality of spacers or members 24, each of which extends through a vertical passage formed by adjacent coils of each conductor layer. When the spacers 24 are thus utilized, it is desirable that adjacent conductor layers be separated by cleats or spacing members 25, each having, preferably, a single passage through which the spacers 24 are passed after said spacing members 25 have been placed in position. As illustrated, it is desirable that the spacers 24, at each end, be provided with aligned perforations through which extends a pin or member 26 which coacts with one or more of the spacing members 25 to maintain the reinforcing structure comprising the spacers 24 and the members 25 in position. It shall be understood, in each reinforcing structure between the spacers 19, that there may be utilized any suitable number of the spacers 24. The rods 24 and spacing members 25 are formed of any suitable insulating material, fullerboard, asbestos micarta, cement or molded composition.

Although, the winding W is herein illustrated as formed upon a cylinder 1 destined to form a part of the winding structure, it shall be understood that a form or member may be utilized similar to the cylinder 1 but which is not destined to form a part of the permanent winding structure.

It shall be understood that the winding W may be of substantially different character and formed in a substantially different manner from that herein described. My invention, from a fundamental viewpoint, involves the step-by-step elevation of the spacers 19 and the utilization of the cleats 20 as described. Obviously, the winding W may assume any one of a variety of forms while still utilizing reinforcing and spacing structure of the character described.

It shall also be understood that my invention is not to be limited to the provision of a single winding W as described herein, for, under some circumstances, it may be desirable to form the winding W from two or more individual conductors destined to be placed in parallel relation with respect to an electrical circuit.

A winding of the character herein described is utilizable particularly, although not necessarily, as a reactor for current-limiting purposes. Under such circumstances, the conductor from which the winding is formed should be of relatively large diameter and may be either insulated or uninsulated, as desired.

I claim as my invention:

1. A winding comprising superposed conductor layers, apertured spacing members, having apertures in alignment disposed between said layers, and spacers extending through said apertured spacing members and between adjacent convolutions of said layers.

2. A winding comprising superposed conductor layers, apertured spacing members disposed between said layers, spacers extending through said apertured spacing members and between adjacent convolutions of said layers, and members extending axially of said winding and to which said spacing members are secured.

3. A winding comprising superposed conductor layers, apertured spacing members of insulating material disposed between said layers, spacing rods of insulating material extending through said apertured spacing members and between adjacent convolutions of said layers, and members extending axially of said winding and to which said spacing members are secured.

4. A winding comprising superposed conductor layers, apertured spacing members of fullerboard disposed between said layers, spacing rods of fullerboard extending through said apertured spacing members and between adjacent convolutions of said layers, and fullerboard members extending axially of said winding and to which said spacing members are secured.

5. A winding comprising superposed conductor layers, groups of apertured spacing members, having apertures in alignment, disposed between said layers and converging toward a common point, spacers extending through said apertured spacing members and between adjacent convolutions of said layers, members extending axially of said winding and to which said spacing members are secured, and clamping means for said winding disposed between said group of apertured spacing members.

6. A winding comprising superposed conductor layers, groups of apertured spacing members, having apertures in alignment, disposed between said layers and converging toward a common point, spacers extending through said apertured spacing members and between adjacent convolutions of said layers, members extending axially of said winding and to which said spacing members are secured, and other spacers extending between adjacent convolutions of said layers between said group of apertured spacing members.

In testimony whereof, I have hereunto subscribed my name this 2d day of November, 1927.

ROBERT B. GEORGE.